March 1, 1960 W. A. MOD ET AL 2,926,995
PROCESS FOR PRODUCING LARGE SODIUM BICARBONATE CRYSTALS
Filed Aug. 1, 1956
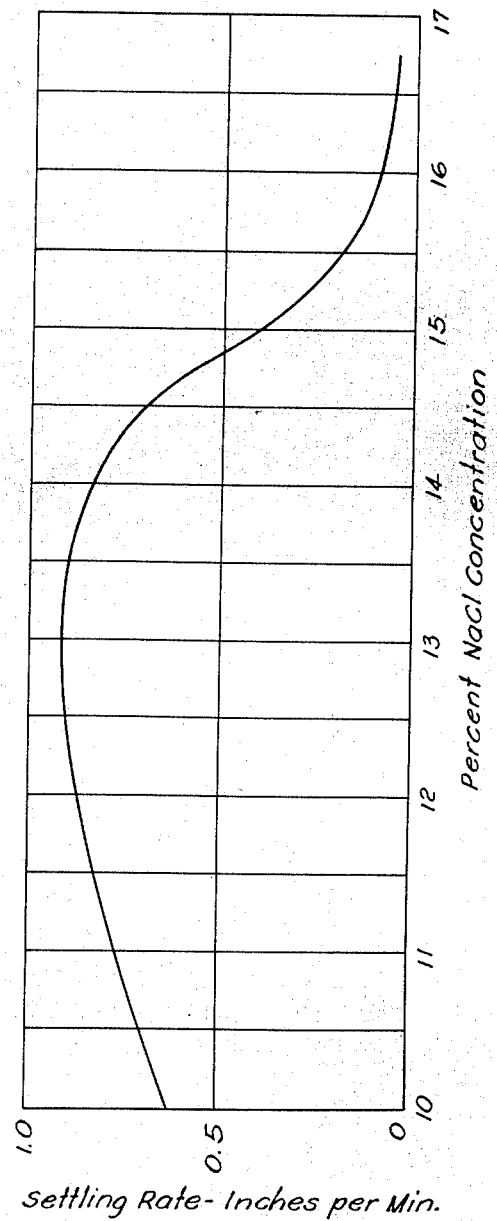
INVENTORS.
William A. Mod
Charles W. Becker
Elwood L. Carlson
BY *Griswold & Burdick*
ATTORNEYS

United States Patent Office 2,926,995
Patented Mar. 1, 1960

2,926,995

PROCESS FOR PRODUCING LARGE SODIUM BICARBONATE CRYSTALS

William A. Mod, Freeport, Charles W. Becker, Angleton, and Elwood L. Carlson, Lake Jackson, Tex., assignors to The Dow Chemical Company, Midland, Mich., a corporation of Delaware Application August 1, 1956, Serial No. 601,534

9 Claims. (Cl. 23—64)

This invention relates to a process for producing large sodium bicarbonate crystals, and more particularly, to a process for the preparation of sodium bicarbonate in large crystals by carbonation of a sodium carbonate solution containing sodium chloride.

The preparation of sodium bicarbonate by carbonation of sodium carbonate solutions containing sodium chloride is well known. Osborne Patent Number 2,383,674 discloses a process where effluent from electrolytic caustic soda-chlorine cells is carbonated and sodium bicarbonate obtained. In the carbonation of sodium carbonate solutions, two disadvantages are present. The first is the high solubility of sodium bicarbonate in the solution so that low yields are obtained, and the second is the formation of small crystals of sodium bicarbonate. Osborne Patent Number 2,383,674 circumvents the first disadvantage by precipitating the sodium bicarbonate from sodium carbonate solutions which have been saturated with sodium chloride. However, under the conditions proposed by the cited patent, small crystals of sodium bicarbonate are obtained. When fine crystals are formed, they are difficult to separate from the mother liquor. The fine crystals clog the filtering cloths or screens and form a low porosity cake which greatly decreases the filter capacity of a given filter. Furthermore, the fine crystals have the property of retaining a large amount of mother liquor which not only increases the impurities in the product but is also detrimental to the efficiency of the calcining operation when the bicarbonate is converted to soda ash. A thorough and prolonged washing will partially remove the mother liquor and the impurities which the mother liquor contains, but it is practically impossible to displace all of the mother liquor. The capillary forces within a filter cake of fine crystals are considerably greater than for a large crystal cake and consequently the mother liquor is tenaciously retained by the cake. By the prolonged washing the yields are considerably lowered by the dissolution of the sodium bicarbonate product. In the calcining furnace, the large amount of moisture that the cake contains must be evaporated which causes excessive corrosion to the equipment and a high fuel consumption.

It is, therefore, a principal object of this invention to provide a process wherein high yields and large crystals of sodium bicarbonate are obtained so that the above disadvantages characteristic of fine crystals are eliminated.

The above and other objects are accomplished by carbonating the sodium carbonate solutions containing sodium chloride under controlled conditions. The alkalinity of the solution must be equivalent to from 9.5 to 11.25 weight percent of sodium carbonate and the sodium chloride content in the mixture in the range of 11.0 to 14.5 weight percent. This solution is then contacted with a gas stream containing from 10 to 90 volume percent of carbon dioxide in the range of 0.12 to 2.4 standard cubic feet per minute per cubic foot of solution at a temperature in the range of 45° to 100° C. Upon completion of the carbonation, the remaining solution in the mixture may be saturated with sodium chloride to increase the yields of sodium bicarbonate and the sodium bicarbonate recovered from the resulting mixture.

It has been discovered that in order to obtain large crystals of sodium bicarbonate, it is essential to control the carbonating conditions. The critical factors are the alkalinity and the sodium chloride content of the mixture, the temperature of the carbonation, and the rate and carbon dioxide concentration of the gas stream used. It is necessary to maintain all of these factors within critical ranges as the variation of any one of the conditions from this range will result in obtaining fine crystals.

The alkalinity of the mixture must be equivalent to a mixture which contains from 9.5 to 11.25 weight percent of sodium carbonate, preferably 10.6 weight percent, and the sodium chloride content must be in the range of 11.0 to 14.5 weight percent, preferably from 12.5 to 13.5 weight percent. The sodium chloride content of the mixture has a very unusual effect upon the crystal size of the final product. When the sodium chloride content is greater than 14.5 weight percent or less than 11.0 weight percent, small crystals will be obtained. The attached figure shows this effect wherein the abscissa is a weight percent of sodium chloride and the ordinate is the settling rate of the sodium bicarbonate crystals in inches per minute. The details and data upon which the figure is based are given in Example I. From the curve, it is apparent that the size of the crystals obtained from solutions containing more than 14.5 weight percent sodium chloride rapidly decreases as the sodium chloride concentration is increased which is indicated by the rapidly decreasing settling rate. When the sodium chloride content is decreased below the preferred range, the settling rate of the crystals decreases, but not as rapidly. At the lower sodium chloride concentrations, the crystals obtained will contain some large crystals, but the major portion of the crystals are fine and difficult to separate from the mother liquor. In addition, the dilution required at sodium chloride concentrations below the critical range would result in a much lower sodium bicarbonate recovery.

The temperature of the carbonation must be at least 45° C. and preferably in the range of 55° to 60° C. Temperatures up to 100° C. may be used, but since the solubility of sodium bicarbonate will increase with the higher temperatures, temperatures above 60° C. are seldom used.

In the carbonation, the combination of the gas rate and the concentration of the carbon dioxide is critical. Gas streams containing from 10 to 90 volume percent of carbon dioxide may be used, but the gas rate at which the mixture is contacted must be increased as the carbon dioxide concentration in the gas stream is lowered. For gas streams containing 90 volume percent carbon dioxide, a gas rate as low as 0.12 standard cubic foot per minute per cubic foot of mixture may be used, but with a 10 volume percent carbon dioxide gas stream, a rate of at least 2.4 feet must be employed. It is preferred to use a gas stream containing from 25 to 35 percent of carbon dioxide and to use a gas rate in the range of 0.4 to 1.2 standard cubic feet per minute per cubic foot of mixture. After around 64 percent of the sodium carbonate has been converted to sodium bicarbonate, the rate of conversion of the remaining sodium carbonate may be increased by increasing the carbon dioxide concentration in the gas stream to at least 70 volume percent.

The required alkalinity and sodium chloride concentration are such that the effluent obtained from caustic soda chlorine electrolytic cells will normally not be of correct composition, and it will be necessary to adjust these conditions before carrying out the critical crystal growth carbonation step. In producing caustic by the electrolytic cells, a saturated sodium chloride solution is electrolyzed resulting in an effluent containing a caustic solution which is almost saturated with sodium chloride. If the cell is operated to give 8.5 to 9.5 weight percent sodium hydroxide, then the sodium chloride content of the effluent would be in the range of 15.5 to 16 weight percent. If the cell is operated to give 11.5 weight percent sodium hydroxide, then the sodium chloride content would be lower and in the neighborhood of 13 to 14 percent, but the equivalent sodium carbonate alkalinity would be about 15 percent which is above the critical range.

It has been further discovered that while large crystals are obtained by carbonating the mixture under the controlled conditions, it is only essential to maintain these conditions during the carbonation of the sodium carbonate mixture when the mixture contains from 30 to 64 percent of the sodium carbonate in the mixture converted to sodium bicrabonate. The carbonating conditions of the mixture before 30 percent or after 64 percent of the sodium carbonate is converted to sodium bicarbonate are relatively immaterial to the crystal size of the sodium bicarbonate product obtained. Consequently it is preferred to carry out the carbonation in three stages where the controlled conditions are only maintained in the second stage.

In the first stage the sodium bicarbonate solution containing sodium chloride is contacted with a gas stream containing carbon dioxide until not more than 30 percent of the sodium carbonate in the solution is converted to sodium bicarbonate or until the sodium bicarbonate is nearly ready to precipitate out. In the carbonation of a sodium carbonate solution, the precipitation of sodium bicarbonate does not ordinarily occur in any appreciable amounts until after around 30 percent of the sodium carbonate is converted to sodium bicarbonate. At the beginning of the carbonation, the sodium bicarbonate which is formed combines with the sodium carbonate to form sesqui-carbonate. This sesqui-carbonate is formed until around 30 percent of the sodium carbonate is converted to sodium bicarbonate and then further carbonation results in the precipitation of the sodium bicarbonate. In the second stage, the alkalinity and the sodium chloride content of the partially carbonated mixture from the first stage is adjusted so that the alkalinity and the sodium chloride content are within the critical limits. The adjusted mixture is then carbonated under the required conditions until at least 64 percent of the sodium carbonate in the mixture is converted to sodium bicarbonate. In the third stage, the partially carbonated adjusted mixture may be further carbonated at other than critical conditions. Generally a gas stream containing at least 70 volume percent of carbon dioxide is used. The sodium bicarbonate obtained is separated from the mother liquor, washed with water, and dried or calcined if it is desired to produce a soda ash. To increase the recovery of sodium bicarbonate, sodium chloride may be added to the mixture just prior to or after the third stage carbonation.

Since the carbonating conditions during the first stage and third stage carbonation do not materially effect the crystal size of the final product, the carbonation for these stages is usually carried out with mixtures containing a high sodium chloride content. With an increase in sodium chloride content, the rate of solution of carbon dioxide in the mixture is increased and thus a higher carbon dioxide absorption efficiency can be obtained.

In the first stage it is preferred to maintain a sodium chloride concentration in the range of 15 to 16 weight percent. The carbon dioxide absorption efficiency obtained with this concentration of sodium chloride is in the range of 50 to 55 percent, while if the sodium chloride content is in the range of 13 to 14 weight percent, the efficiency obtained is in the range of 35 to 40 percent. Additional increase in the sodium chloride content will further increase the efficiency, but since the sodium chloride content must be decreased in the second stage, the optimum concentration is around 15 to 16 weight percent. In the third stage carbonation, the sodium chloride concentration is increased to about 18 to 20 weight percent, and the mixture is preferably contacted with a gas stream containing at least 70 volume percent of carbon dioxide at a rate in the range of 0.1 to 0.2 standard cubic foot per cubic foot of mixture in order to convert the major portion of the remaining sodium carbonate to sodium bicarbonate product in a relatively short time.

It is apparent to a person skilled in the art that the process of the invention may be carried out in a batch, semi-continuous, or continuous operation. A three stage continuous operation is preferred where each stage of the carbonation is carried out in a separate carbonating tank.

The following examples illustrate the importance of the conditions for the precipitation of sodium bicarbonate in order to obtain large crystals. The determination of the crystal size was made by determining the settling rates of the crystals obtained. This method was adopted since the crystals obtained have irregular shapes which cause them to stick together and give erroneous results if screen analysis is attempted. The settling rates were measured on equal volumes of slurry in a 100 milliliter graduated cylinder. The height of the opaque layer was recorded as it decreased, until the height became essentially constant. A curve was plotted for each run where the depth settled in inches was plotted against the settling time in minutes. These curves gave practically straight lines until the settling was essentially complete, at which point the curve broke over and the depth settled showed practically no change for several minutes. The settling rate for each run was taken as the slope of the line before the break.

*Example I*

To show the effect of sodium chloride concentration upon the crystal size, a series of runs was made where substantially the same conditions were maintained, except for the variation of the sodium chloride content.

A laboratory carbonation tank was used for these runs. The tank was a battery jar, 6 inches I.D. x 8 inches, which was wrapped with insulation and an electrical heating coil. A 1½ inch V-blade type impeller was placed in the tank and a cooling coil to which baffles were attached surrounded the impeller. The sodium carbonate solution containing sodium chloride was placed in the tank and the carbonation carried out by introducing a carbon dioxide containing gas stream under the turning impeller. The carbonation was continued until around 95 percent of the sodium carbonate was converted to sodium bicarbonate. The resulting slurry was cooled to 40° C. and samples of the slurry were taken to determine the settling rate.

The pertinent data and results obtained are given below. The results are also plotted in the attached figure.

| Run Number | NaCl of Mixture, Weight Percent | Alkalinity, $Na_2CO_3$, Weight Percent | $CO_2$ Content of Gas, Vol. Percent | Gas Rate, s.c.f.m./ $Ft.^3$ of Mixture | Temp., ° C. | Settling Rate, Inches/ Min. |
|---|---|---|---|---|---|---|
| 1 | 10.12 | 10.68 | 15 | 2.39 | 55 | 0.644 |
| 2 | 12.04 | 10.51 | 15 | 2.39 | 55 | 0.865 |
| 3 | 14.07 | 10.71 | 15 | 2.39 | 55 | 0.830 |
| 4 | 16.08 | 10.68 | 15 | 2.39 | 55 | 0.080 |
| 5 | 16.71 | 10.6 | 15 | 2.39 | 55 | 0.063 |

*Example II*

To show the effect of alkalinity two runs were made in the manner described in Example I where the alkalinity was varied. The pertinent data and results obtained are as follows:

|  | Run I | Run II |
|---|---|---|
| Na₂CO₃, Weight Percent | 10.53 | 11.47 |
| NaCl, Weight Percent | 11.98 | 12.01 |
| CO₂ Content, Vol. Percent | 40 | 40 |
| Gas Rate, s.c.f.m./ft.³ of mixture | 1.197 | 1.197 |
| Temperature, °C | 50 | 50 |
| Settling Rate, Inches/Min | 0.825 | 0.472 |

*Example III*

A semi-continuous three-stage carbonation was carried out in a pilot plant consisting of a 4-foot diameter carbonating tank equipped with a heating and cooling coil, a 14-inch turbine mixer, and a gas inlet beneath the mixer and two storage tanks equipped with heating and cooling coils and mixers.

In the operation of the pilot plant, the carbonating tank and one of the storage tanks were filled with a sodium carbonate solution containing 10.65 weight percent of sodium carbonate and 16.3 weight percent of sodium chloride. The sodium carbonate solution in the carbonating tank was carbonated until around 30.9 percent of the sodium carbonate was converted to sodium bicarbonate. Then the fresh sodium carbonate solution from the storage tank was continuously added at a rate of 241 pounds per hour, and part of the partially carbonated mixture from the carbonating tank was withdrawn at the same rate and stored in the second storage tank. At the above rate the mixture in the carbonating tank was maintained at around 30.9 percent of the sodium carbonate converted to sodium bicarbonate, and a retention time of 84 minutes was provided.

After all of the available sodium carbonate solution stored in the first storage tank was thus carbonated, the first stage carbonation was discontinued, and the second stage carbonation started. The alkalinity and sodium chloride content of the mixture remaining in the carbonating tank was adjusted to equal to 10.7 weight percent of sodium carbonate and 13.8 weight percent of sodium chloride by addition of water and sodium bicarbonate. This mixture was then carbonated until 64 percent of the sodium carbonate was converted to sodium bicarbonate. Then the mixture carbonated in the first stage and stored in the second storage tank was added continuously at a rate of around 210 pounds per hour and a stream withdrawn and stored in the first storage tank at the same rate. At the above rate, a retention time of 86 minutes was provided and the mixture in the carbonating tank maintained at 64 percent of the sodium carbonate converted to sodium bicarbonate. The alkalinity and sodium chloride concentration were maintained at 10.7 and 13.8 weight percent, respectively, by continuously adding 66.9 pounds per hour of sodium bicarbonate and 325 pounds per hour of water in addition to the 210 pounds per hour of the first stage carbonated mixture. After all of the first stage carbonated mixture was carbonated to 64 percent, the second stage carbonation was discontinued.

The third stage carbonation was carried out in the same manner described above. Sodium chloride was added until the sodium chloride concentration was 19.6 weight percent and the carbonation continued until 96.5 percent of the sodium carbonate was converted to sodium bicarbonate. When the second stage carbonated mixture was added to the carbonating tank, sodium chloride was also continuously added at a rate of 285 pounds per hour to maintain the sodium chloride concentration at 19.6 weight percent. A retention time of 60 minutes was provided.

The temperature during the carbonation was maintained at 60° C. for all stages.

The gas rates used and the concentrations of the carbon dioxide in the gas were as follows:

|  | CO₂, Vol. Percent | Gas Rate, s.c.f.m./ft.³ of Mixture |
|---|---|---|
| 1st stage | 12.5 | 1.82 |
| 2nd stage | 29.0 | 0.48 |
| 3rd stage | 90.6 | 0.19 |

The sodium bicarbonate crystals obtained from the 3rd stage had a settling rate of 2.7 inches per minute. It will be noted that when operating in the pilot plant much larger crystals were obtained than were obtained in the small laboratory carbonation tank which was used in Examples I and II. This difference may be accounted for by the fact that in the pilot plant the temperature was maintained at 60° C., whereas in the laboratory carbonator the temperature was 55° C. or below. Also it has been found that a process which is carried out on a larger scale and by continuous operation will produce much larger crystals than one which is carried out in small equipment in a batch operation. However, the effect of the carbonating conditions on crystal size in the small laboratory carbonation tank is comparable to the results obtained in the pilot plant, since the trends found in the small laboratory carbonation are duplicated closely in the pilot plant.

What is claimed is:

1. A process for the production of large sodium bicarbonate crystals by carbonation of a sodium carbonate solution containing sodium chloride as the only other salt dissolved in the solution in a substantial amount, which comprises contacting a sodium carbonate solution having an alkalinity equivalent to from 9.5 to 11.25 weight percent of sodium carbonate and containing from 11.0 to 14.5 weight percent of sodium chloride with a gas stream containing from 10 to 90 volume percent of carbon dioxide at a rate in the range of 0.12 to 2.4 standard cubic feet per minute per cubic foot of solution at a temperature in the range of from 45° to 100° C.

2. A process for production of large sodium bicarbonate crystals by carbonation of a sodium carbonate solution containing sodium chloride as the only other salt dissolved in the solution in a substantial amount, which comprises contacting a sodium carbonate solution having an alkalinity equivalent to 10.6 weight percent sodium carbonate and containing from 12.5 to 13.5 weight percent of sodium chloride with a gas stream containing from 25 to 35 volume percent of carbon dioxide at a rate in the range of 0.4 to 1.2 standard cubic feet per minute per cubic foot of solution at a temperature in the range of 55° to 60° C.

3. A process for production of large sodium bicarbonate crystals by carbonation of a sodium carbonate solution containing sodium chloride as the only other salt dissolved in the solution in a substantial amount, which comprises adjusting the alkalinity and the sodium chloride content of the solution such that the alkalinity is equivalent to 10.6 weight percent of sodium carbonate and the sodium chloride content is in the range of 12.5 to 13.5 weight percent, contacting the adjusted solution with a gas stream containing from 25 to 35 volume percent of carbon dioxide at a rate in the range of 0.4 to 1.2 standard cubic feet per minute per cubic foot of solution at a temperature in the range of 55° to 60° C. until a mixture is obtained in which at least 64 percent of the sodium carbonate in the solution is converted to sodium bicarbonate, and further contacting the partially carbonated mixture with a gas stream containing at least 70 volume percent of carbon dioxide to convert the major portion of the remaining sodium carbonate to sodium bicarbonate.

4. A process for the production of large sodium bicarbonate crystals by carbonation of a sodium carbonate solution containing sodium chloride as the only other salt dissolved in the solution in a substantial amount, which comprises contacting the sodium carbonate solution with a gas stream containing carbon dioxide until a mixture is obtained in which not more than 30 percent of the sodium carbonate in the solution is converted to sodium bicarbonate, adjusting the alkalinity and the sodium chloride content of the mixture such that the alkalinity is equivalent to from 9.5 to 11.25 weight percent of sodium carbonate and the sodium chloride content is in the range from 11.0 to 14.5 weight percent, contacting the adjusted mixture with a gas stream containing from 10 to 90 volume percent of carbon dioxide at a rate in the range of 0.12 to 2.4 standard cubic feet per minute per cubic foot of the mixture at a temperature in the range of 45° to 100° C. until at least 64 percent of the sodium carbonate in the mixture is converted to sodium bicarbonate, and further contacting the partially carbonated mixture with a gas stream containing carbon dioxide.

5. A process for the production of large sodium bicarbonate crystals by carbonation of a sodium carbonate solution containing sodium chloride as the only other salt dissolved in the solution in a substantial amount, which comprises contacting the sodium carbonate solution with a gas stream containing carbon dioxide until a mixture is obtained in which not more than 30 percent of the sodium carbonate in the solution is converted to sodium bicarbonate, adjusting the alkalinity and the sodium chloride content of the mixture such that the alkalinity is equivalent to 10.6 weight percent of sodium carbonate and the sodium chloride content is in the range from 12.5 to 13.5 weight percent, contacting the adjusted mixture with a gas stream containing from 25 to 35 volume percent of carbon dioxide at a rate in the range of 0.4 to 1.2 standard cubic feet per minute per cubic foot of the mixture at a temperature in the range of 55° to 60° C. until at least 64 percent of the sodium carbonate in the mixture is converted to sodium bicarbonate, and further contacting the partially carbonated mixture with a gas stream containing at least 70 volume percent of carbon dioxide.

6. A process for the production of large sodium bicarbonate crystals by carbonation of a sodium carbonate solution containing sodium chloride as the only other salt dissolved in the solution in a substantial amount, which comprises contacting the sodium carbonate solution with a gas stream containing carbon dioxide until a mixture is obtained in which not more than 30 percent of the sodium carbonate in the solution is converted to sodium bicarbonate, adjusting the alkalinity and the sodium chloride content of the mixture such that the alkalinity is equivalent to from 9.5 to 11.25 weight percent of sodium carbonate and the sodium chloride content is in the range from 11.0 to 14.5 weight percent, contacting the adjusted mixture with a gas stream containing from 10 to 90 volume percent of carbon dioxide at a rate in the range of 0.12 to 2.4 standard cubic feet per minute per cubic foot of the mixture at a temperature in the range of 45° to 100° C. until at least 64 percent of the sodium carbonate in the mixture is converted to sodium bicarbonate, subsequently adding sodium chloride to the mixture until the resulting mixture contains from 18 to 20 weight percent of sodium chloride, contacting the resulting mixture with a gas stream containing carbon dioxide to further carbonate the remaining sodium carbonate, and separating the sodium bicarbonate from the mixture.

7. A process for the production of large sodium bicarbonate crystals by carbonation of a sodium carbonate solution containing sodium chloride as the only other salt dissolved in the solution in a substantial amount, which comprises adjusting the alkalinity and the sodium chloride content of the solution such that the alkalinity is equivalent to 10.6 weight percent of sodium carbonate and the sodium chloride content is in the range of 12.5 to 13.5 weight percent contacting the adjusted solution with a gas stream containing from 25 to 35 volume percent of carbon dioxide at a rate in the range of 0.4 to 1.2 standard cubic feet per minute per cubic foot of solution at a temperature in the range of 55° to 60° C. until a mixture is obtained in which at least 64 percent of the sodium carbonate in the solution is converted to sodium bicarbonate, subsequently adding sodium chloride to the mixture until the resulting mixture contains from 18 to 20 weight percent of sodium chloride, contacting the resulting mixture with a gas stream containing at least 70 volume percent of carbon dioxide to convert the major portion of the remaining sodium carbonate to sodium bicarbonate, and separating the sodium bicarbonate from the mixture.

8. A process for the production of large sodium bicarbonate crystals by the carbonation of a sodium carbonate solution containing sodium chloride as the only other salt dissolved in the solution in a substantial amount, which comprises adjusting the sodium chloride content of the solution such that it contains from 15 to 16 weight percent of sodium chloride, contacting the solution with a gas stream containing carbon dioxide until a mixture is obtained in which not more than 30 percent of the sodium carbonate in the solution is converted to sodium bicarbonate, adjusting the alkalinity and the sodium chloride content of the mixture such that the alkalinity is equivalent to 10.6 weight percent of sodium carbonate and the sodium chloride content is from 12.5 to 13.5 weight percent, contacting the adjusted mixture with a gas stream containing from 25 to 35 volume percent of carbon dioxide at a rate in the range of 0.4 to 1.2 standard cubic feet per minute per cubic foot of the mixture at a temperature in the range of 55° to 60° C. until at least 64 percent of the sodium carbonate in the mixture is converted to sodium bicarbonate, subsequently adding sodium chloride to the mixture until the resulting mixture will contain 18 to 20 weight percent of sodium chloride, contacting the resulting mixture was a gas stream containing at least 70 volume percent of carbon dioxide at a rate in the range of 0.1 to 0.2 standard cubic foot per minute per cubic foot of mixture, to further carbonate the remaining sodium carbonate, and separating the sodium bicarbonate from the mixture.

9. A process for the production of large sodium bicarbonate crystals by the carbonation of a sodium carbonate solution containing sodium chloride as the only other salt dissolved in the solution in a substantial amount, which comprises adjusting the sodium chloride content of the solution such that it contains from 15 to 16 weight percent of sodium chloride, contacting the solution with a gas stream containing carbon dioxide until a mixture is obtained in which not more than 30 percent of the sodium carbonate in the solution is converted to sodium bicarbonate, adjusting the alkalinity and the sodium chloride content of the mixture such that the alkalinity is equivalent to from 9.5 to 11.25 weight percent of sodium carbonate and the sodium chloride content is from 11.0 to 14.5 weight percent, contacting the adjusted mixture with a gas stream containing from 10 to 90 volume percent of carbon dioxide at a rate in the range of 0.12 to 2.4 standard cubic feet per minute per cubic foot of the mixture at a temperature in the range of 45° to 100° C. until at least 64 percent of the sodium carbonate in the mixture is converted to sodium bicarbonate, subsequently adding sodium chloride to the mixture until the resulting mixture will contain 18 to 20 weight percent of sodium chloride, contacting the resulting mixture with a gas stream containing carbon dioxide to further carbonate the remaining sodium carbonate, and separating the sodium bicarbonate from the mixture.

References Cited in the file of this patent
UNITED STATES PATENTS

| | | |
|---|---|---|
| 1,477,086 | Souchy | Dec. 11, 1923 |
| 1,865,833 | Chesny | July 5, 1932 |
| 2,383,674 | Osborne | Aug. 28, 1945 |
| 2,792,283 | Hill et al. | May 14, 1957 |